(12) United States Patent
Yamane et al.

(10) Patent No.: US 8,456,962 B2
(45) Date of Patent: Jun. 4, 2013

(54) MAGNETIC HEAD FOR MICROWAVE ASSISTED MAGNETIC RECORDING

(75) Inventors: Takekazu Yamane, Tokyo (JP); Yoshikazu Soeno, Tokyo (JP); Akimasa Kaizu, Tokyo (JP); Naomichi Degawa, Tokyo (JP); Hayato Koike, Tokyo (JP)

(73) Assignee: TDK Corporation, Tokyo (JP)

( * ) Notice: Subject to any disclaimer, the term of this patent is extended or adjusted under 35 U.S.C. 154(b) by 229 days.

(21) Appl. No.: 13/076,793

(22) Filed: Mar. 31, 2011

(65) Prior Publication Data

US 2012/0250472 A1  Oct. 4, 2012

(51) Int. Cl.
  *G11B 11/00* (2006.01)
  *G11B 5/17* (2006.01)

(52) U.S. Cl.
  USPC .................... 369/13.01; 360/123.05

(58) Field of Classification Search
  USPC .......... 369/13.01, 13.33, 13.32, 13.24, 13.14, 369/13.03, 13.02, 13.12, 13.13, 13.35, 112.27; 360/59, 125.31, 125.74, 125.02, 123.46, 360/123.25, 123.03, 123.05
  See application file for complete search history.

(56) References Cited

U.S. PATENT DOCUMENTS 8,107,352 B1 *  1/2012  Yamanaka et al. ....... 369/112.27
2012/0127610 A1 *  5/2012  Aoyama et al. .......... 360/123.05
2012/0320474 A1 * 12/2012  Soeno et al. .................. 360/319

FOREIGN PATENT DOCUMENTS

JP    A-2009-080869    4/2009

OTHER PUBLICATIONS

F. Giesen, "Vortex Circulation Control in Large Arrays of Asymmetric Magnetic Rings," *Physical Review B 75*, pp. 1-4 (2007).
S. S. P. Parkin, "Oscillatory Magnetic Exchange Coupling through Thin Copper Layers," *Physical Review Letters*, vol. 66, No. 16, pp. 2152-2155 (1991).
J.J. Krebs, "Magnetic Resonance Determination of the Antiferromagnetic Coupling of Fe Layers through Cr," *Physical Review Letters*, vol. 63, No. 15, pp. 1645-1648 (1989).
M. Igarashi, "Mechanism of Microwave Assisted Magnetic Switching," *Journal of Applied Physics*, (2009).
K. Noma, "Effects of Underlayer on One-directional Anisotropy in Spin-value Films without any Antiferromagnetic Layers," *Journal of Applied Physics*, vol. 95, No. 11, pp. 6669-6671 (2004).

* cited by examiner

*Primary Examiner* — Ali Neyzari
(74) *Attorney, Agent, or Firm* — Posz Law Group, PLC (57) ABSTRACT

A magnetic head that writes information to a recording medium includes a magnetic pole layer that generates a writing magnetic field to the recording medium, a microstripline that is disposed in proximity to the magnetic pole layer and to which high frequency current is applied, and a ferromagnetic thin film that is disposed on a portion of the microstripline that faces the recording medium, and that generates a high frequency alternate-current (AC) magnetic field to be applied to the recording medium, using a current magnetic field generated on the microstripline due to the high frequency current.

14 Claims, 12 Drawing Sheets

MAGNETIC HEAD FOR MICROWAVE ASSISTED MAGNETIC RECORDING

BACKGROUND OF THE INVENTION

1. Field of the Invention

The present invention relates to a magnetic head, and particularly to a magnetic head including a microstripline for writing information to a recording medium by using a microwave assisted magnetic recording system.

2. Description of the Related Art

In recent years, high recording density has been demanded in hard disk drives (HDD), and a perpendicular magnetic recording system has been used as the recording system therefor. In the perpendicular magnetic recording system, a magnetic domain size is reduced, and high recording density is realized by making the magnetization direction of a recording bit (magnetic domain) perpendicular to a recording medium.

In general, when a magnetic domain is miniaturized, a heat stability problem of recording magnetization occurs in conjunction with the volume reduction of magnetic microparticles that form the recording medium. In other words, there is a risk of loosing information that is recorded on the recording medium due to so-called "heat fluctuation" of magnetization. This is much the same in the perpendicular magnetic recording system. As a method to solve the heat stability problem, use of a material that has a large magnetic anisotropy for the recording medium can be considered. In that case, an extremely large recording magnetic field (writing magnetic field) by the magnetic head is required to perform magnetization reversal in order to write information to the recording medium.

In the perpendicular magnetic recording system, a magnetic head known as a single magnetic pole type is used. As for this type of magnetic head, there is a demand for narrowing the width of a magnetic pole layer that generates a recording magnetic field in correspondence with the high recording density (narrowing the track width) of the recording medium. However, since narrowing the magnetic pole width leads to a reduction of the generated recording magnetic field, it is not preferable for the recording medium that requires an extremely large recording magnetic field as described above.

In contrast, a recording system, which is referred to as a microwave assisted magnetic recording system, is proposed that enables magnetization reversal with a weak recording magnetic field. According to this recording system, it becomes possible to reduce the recording magnetic field necessary for magnetization reversal by applying a high frequency alternate-current (AC) magnetic field (hereinafter, referred to as the "assisting magnetic field") in an in-plane direction of the recording medium simultaneously with the recording magnetic field. The frequency of the assisting magnetic field applied at that time is the frequency (between several GHz and 10 GHz) of the microwave band that corresponds to the ferromagnetic resonant frequency of the recording medium.

There is a method using a microstripline as one method to generate the assisting magnetic field. For example, Japanese Laid-Open Patent Application No. 2009-80869 discloses a magnetic head with a microwave path (microstripline) in the vicinity of a magnetic pole that generates a perpendicular magnetic field (writing magnetic field). In this magnetic head, a portion of the microstripline is formed so as to face the recording medium. A high frequency current is applied to the microstripline, and thereby, an AC magnetic field generated in a region of the microstripline that faces the recording medium is used as the assisting magnetic field.

In the microwave assisted magnetic recording system, there is a demand for further improvement in recording density by concentrating the assisting magnetic field in a more minute region. To accomplish this, the region that generates the assisting magnetic field must be formed narrowly in the method in which the above-described microstripline is used. However, from a perspective of processing technology, there is a limit to narrowly forming the microstripline itself. Further, the ability to apply a large assisting magnetic field to the recording medium allows a material having a large magnetic anisotropy to be used as the recording medium. However, in the method described above, even if the microstripline could be formed in a desired shape, it would require an extremely large undesirable current to generate the assisting magnetic field at a level of several kOe.

SUMMARY OF THE INVENTION

The present invention is directed to a magnetic head including a microstripline for writing information to a recording medium using a microwave assisted magnetic recording system. An object of the present invention is to provide a magnetic head that can apply a large assisting magnetic field to a minute region of the recording medium without requiring a large current.

According to embodiments of the present invention, a magnetic head that writes information to a recording medium includes a magnetic pole layer that generates a writing magnetic field to the recording medium, a microstripline that is disposed in proximity to the magnetic pole layer and to which high frequency current is applied, and a ferromagnetic thin film that is disposed on a portion of the microstripline that faces the recording medium, and that generates a high frequency alternate-current (AC) magnetic field to be applied to the recording medium, using a current magnetic field generated on the microstripline due to the high frequency current.

In such a magnetic head, a high frequency AC magnetic field generated by a ferromagnetic thin film is used as the assisting magnetic field. This means that the assisting magnetic field can be applied to a more minute region of the recording medium compared to when a portion of the microstripline that faces the recording medium is narrowly formed and when the current magnetic field generated in such portion is used as the assisting magnetic field. Further, the high frequency AC magnetic field generated by the ferromagnetic thin film is resulted from the precession movement of magnetization generated by the current magnetic field of the microstripline. Therefore, when comparing the current magnetic field generated by a microstripline to an AC magnetic field generated by the ferromagnetic thin film due to the current magnetic field thereof, even when the same high frequency current is applied to the microstripline, a larger AC magnetic field is applied to the recording medium.

In this way, a magnetic head is provided that can apply a large assisting magnetic field to a minute region of the recording medium by using the ferromagnetic thin film as the source for generating the assisting magnetic field, without requiring a large current.

The above-described and other objects, characteristics and advantages of the present invention will be clear from the following description with reference to the attached drawings that illustrate the present invention.

DESCRIPTION OF THE PREFERRED EMBODIMENTS

Hereinafter, description regarding a magnetic head of one embodiment of the present invention will be given with reference to the drawings. It is noted that size ratio between members is different from an actual ratio to make the drawings easy to see in the present specification.

Figure 1:
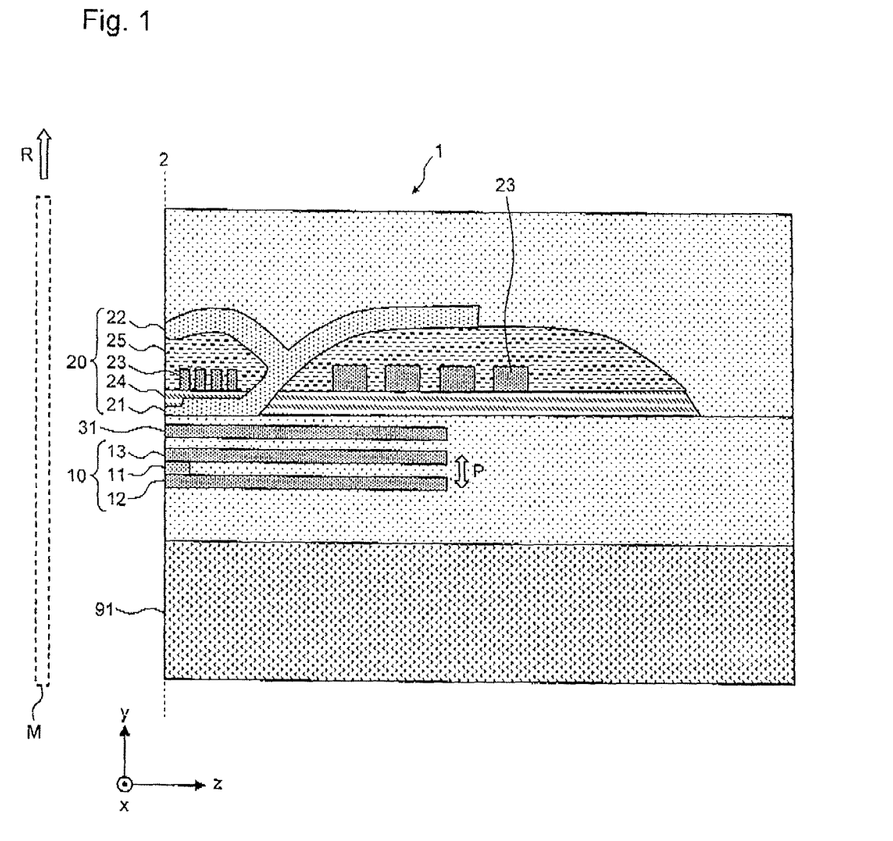
FIG. 1 is a side cross-sectional view illustrating a magnetic head according to one embodiment of the present invention.

FIG. 1 is a side cross-sectional view of a magnetic head of the present embodiment. FIG. 1 illustrates a cross section perpendicular to a surface of a magnetic head 1 that faces a recording medium M, that is, a surface 2 referred to as an air bearing surface (ABS).

The magnetic head 1 is a composite head including a reading part 10 that reads information from the recording medium M and a writing part 20 that writes information to the recording medium M. The reading part 10 and the writing part 20 are arranged along a moving direction of the recording medium M, which is indicated by the arrow R in the drawing, and configure a portion of an air bearing surface 2. An interelement shield layer 31 formed by a sputtering, etc. is disposed between the reading part 10 and the writing part 20.

The reading part 10 includes a magneto-resistive effect (MR) element 11, and first and second shield layers 12 and 13 arranged on both sides in a film surface orthogonal direction P of the MR element 11 in a manner of sandwiching the MR element 11. The first and second shield layers 12 and 13 also function as electrodes for supplying a sense current in the film surface orthogonal direction P of the MR element 11. Accordingly, the MR element 11 is an element including a current perpendicular to the plane (CPP) structure where a sense current flows in a direction orthogonal to a film surface of element. As the MR element 11, a CPP-giant magneto-resistance (GMR) element where the CPP structure is applied to a GMR element using GMR effect, and a tunnel magneto-resistance (TMR) element using TMR effect are preferably used.

The writing part 20 has a configuration for so-called perpendicular magnetic recording. A magnetic pole layer that generates a writing magnetic field is formed with a main magnetic pole layer 21 and an auxiliary magnetic pole layer 22. These magnetic pole layers 21 and 22 are formed by a frame plating method or the like. The main magnetic pole layer 21 is formed of CoFe and is arranged in an orientation nearly orthogonal to the air bearing surface 2 on the air bearing surface 2. A coil layer 23 extending over a gap layer 24 composed of an insulating material is wound around the periphery of the main magnetic pole layer 21 so that a magnetic flux is induced to the main magnetic pole layer 21 by the coil layer 23. The coil layer 23 is formed by a frame plating method or the like. The magnetic flux is guided within the main magnetic pole layer 21 and is emitted from the air bearing surface 2 towards the recording medium M.

The auxiliary magnetic pole layer 22 is a magnetic layer magnetically coupled with the main magnetic pole layer 21. The auxiliary magnetic pole layer 22 is a magnetic pole layer that is formed of an alloy composed of two or three of any of Ni, Fe, Co or the like and has a film thickness between approximately 0.01 µm and approximately 0.5 µm. The auxiliary magnetic pole layer 22 is disposed in a manner of branching from the main magnetic pole layer 21 and faces the main magnetic pole layer 21 with the gap layer 24 and a coil insulating layer 25 therebetween on the air bearing surface 2 side. The end part on the air bearing surface 2 side of the auxiliary magnetic pole layer 22 forms a trailing shield part in which a layer cross section is wider than other parts of the auxiliary magnetic pole layer 22.

Figure 2:
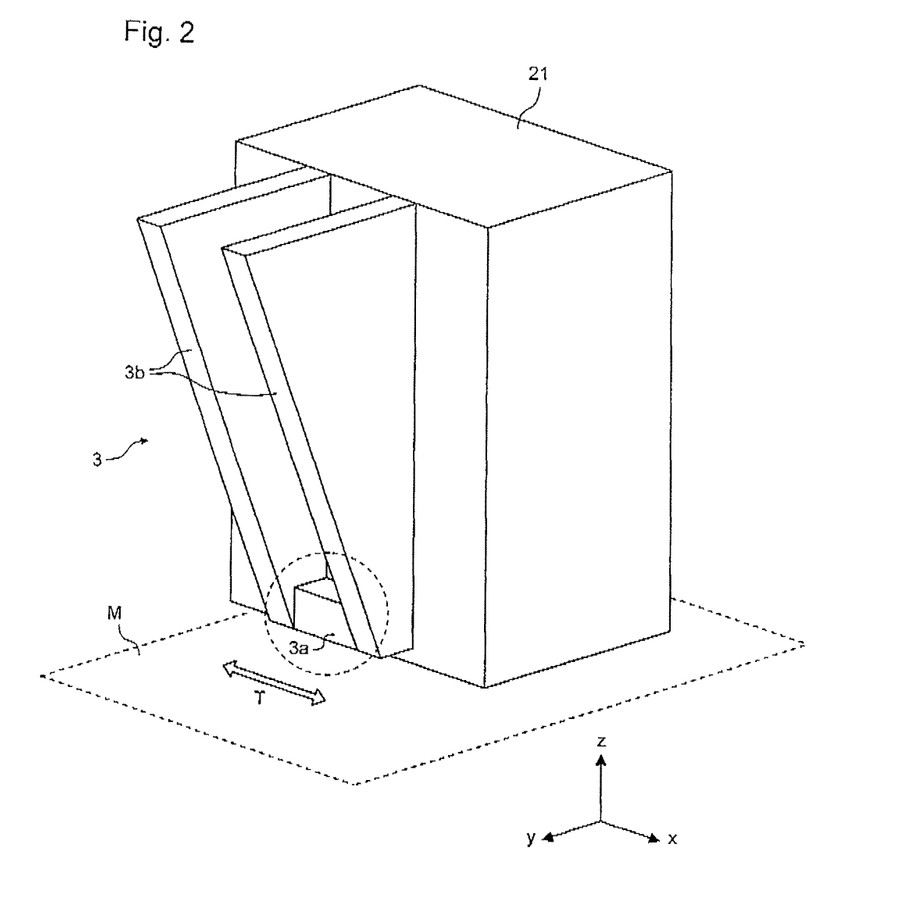
FIG. 2 is a partial breakout perspective view illustrating a writing part of the magnetic head in FIG. 1.

FIG. 2 is a partial breakout perspective view of the writing part 20 of the magnetic head in FIG. 1. FIG. 2 illustrates the main magnetic pole layer 21 viewed from the side facing the air bearing surface 2.

When referring to FIG. 2, a microstripline 3 composed of Au is disposed adjacent to a main magnetic pole layer 21. The microstripline 3 is formed in a gap layer 24 (not illustrated in FIG. 2, see FIG. 1) adjacent to the main magnetic pole layer 21 and has a tip end part 3a and a lead part 3b connected to the tip end part 3a. The tip end part 3a is positioned in proximity to the recording medium M and is arranged so as to extend parallel to a track width direction T. The tip end part 3a and the lead part 3b are U-shaped as viewed from a surface direction (y-direction in the drawing) of the recording medium M that is orthogonal to the track width direction T. The microstripline 3 is preferably formed of a material with low electrical resistance. In the present embodiment, the microstripline 3 is formed of Au; however, another material may be used.

Figure 3A:
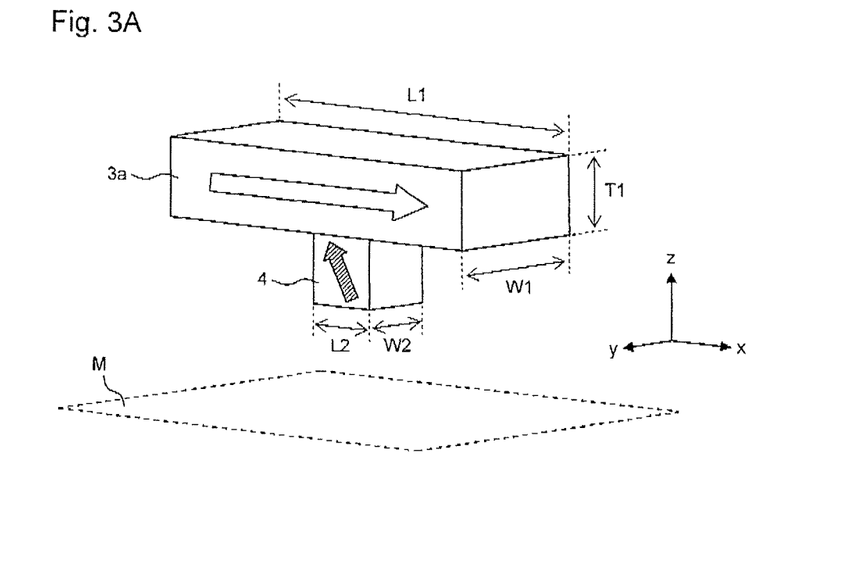
FIG. 3A is an enlarged perspective view within the circle in FIG. 2 illustrating a configuration of the vicinity of a tip end part of a microstripline.
Figure 3B:
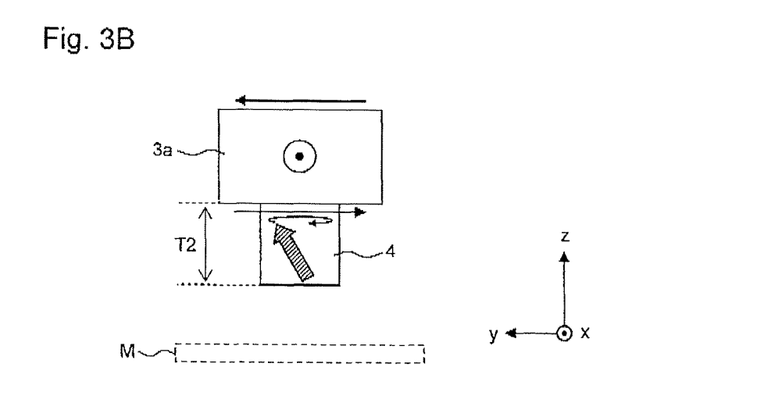
FIG. 3B is an enlarged cross-sectional view, as seen from the x-direction in FIG. 3A.

FIG. 3A is an enlarged schematic perspective view within the circle in FIG. 2 illustrating the vicinity of the tip end part of the microstripline 3. FIG. 3B is a schematic cross-sectional view of FIG. 3A as viewed from the longitudinal direction (x-direction in the drawing) of the tip end part 3a.

When referring to FIG. 3A and FIG. 3B, a ferromagnetic thin film 4 is disposed in parallel with the surface of the recording medium M in a position facing the recording medium M of the tip end part 3a of the microstripline 3. The ferromagnetic thin film 4 is arranged such that its easy magnetization axis is oriented in a direction orthogonal to the film surface, in other words, a direction (the z-direction in the drawing) that is orthogonal to the surface of the microstripline 3 where the ferromagnetic thin film 4 is installed. In this configuration, when a high frequency current (see the outline arrow in FIG. 3A) is applied to the microstripline 3 and a current magnetic field (see the solid arrow in FIG. 3B) is generated in the periphery of the tip end part 3a, the direction of the easy magnetization axis of the ferromagnetic thin film 4 and the direction of the current magnetic field that is sensed by the ferromagnetic thin film 4 are orthogonal to each other. At that time, when a high frequency current with a frequency corresponding to the ferromagnetic resonant frequency of the ferromagnetic thin film 4 is applied to the microstripline 3, ferromagnetic resonance occurs in the ferromagnetic thin film 4. As a result, the precession movement at ferromagnetic resonant frequency occurs in the magnetization of the ferromagnetic thin film 4, and the movement is carried out continuously in large amplitude without attenuating. Therefore, a high frequency oscillating magnetic field (AC magnetic field) caused by the precession movement of the magnetization is applied to the recording medium M to function as the assisting magnetic field.

The ferromagnetic thin film can be formed in a more minute region compared to formation of the tip end part of the microstripline. Therefore, the assisting magnetic field can be applied to a more minute region by using the ferromagnetic thin film as the source for generating the assisting magnetic field.

The configuration of the microstripline and the ferromagnetic thin film are not limited to the above-described configuration as long as the assisting magnetic field originating in the ferromagnetic resonance can be applied to the recording medium.

In the illustrated embodiment, the cross section orthogonal to the longitudinal direction of the tip end part 3a of the microstripline 3 is rectangular shaped; however, it may be another shape. Further, the size of the tip end part 3a can be arbitrarily set so as to apply a current at a desired strength as long as the size is enough not to cause the material melt due to overcurrent. When the cross section is a rectangular shape, the dimensions of the tip end part 3a are, for example, as follows: the length L1 of the track width direction is 2 µm, the width W1 is 200 nm, and the thickness T1 is 100 nm (see FIG. 3A). In contrast, the dimensions of the ferromagnetic thin film 4 are, for example, as follows: the length L2 of the track width is 5 nm, the width W2 is 20 nm, and the thickness T2 is 30 nm (see FIG. 3A and FIG. 3B).

Figure 4:
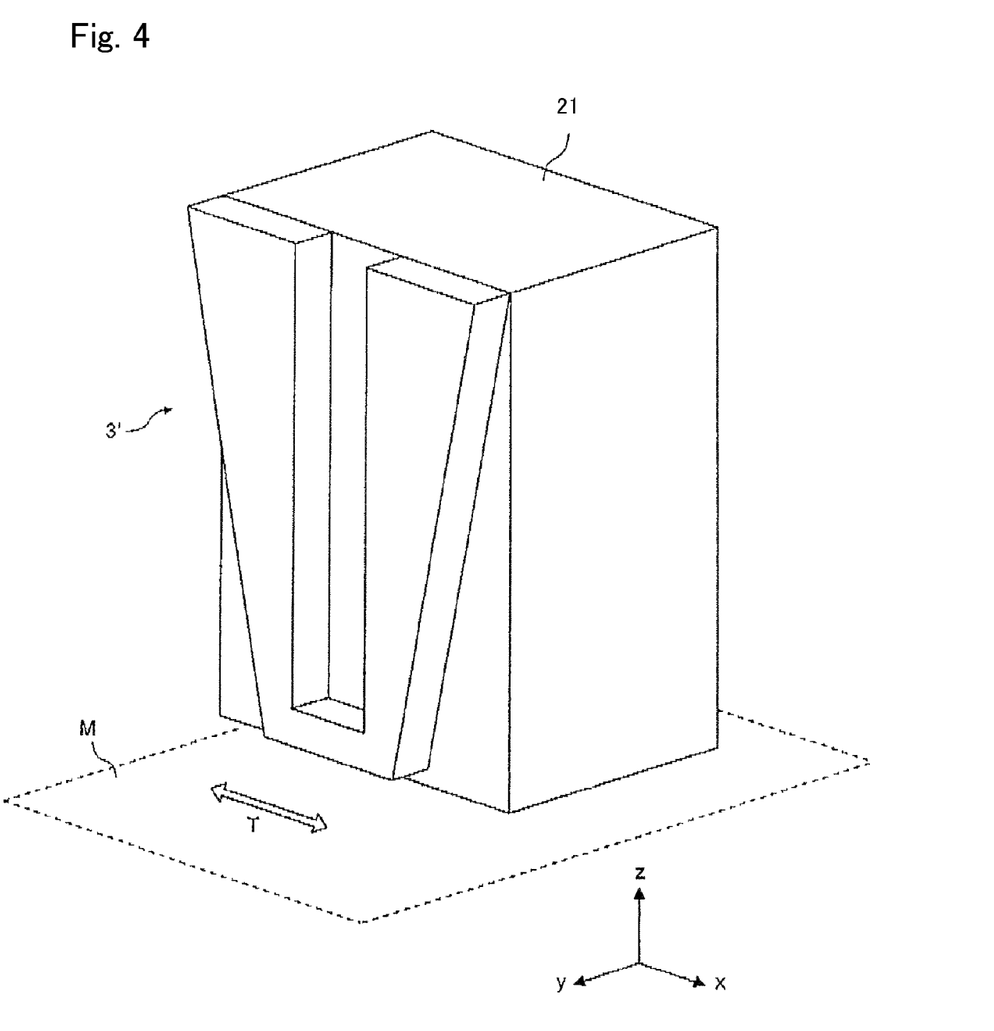
FIG. 4 is a perspective view of a modified example of the microstripline in FIG. 2.

In the meantime, the resistance value of a circuit including the microstripline 3 is preferably as low as possible. Accordingly, the lead part 3b of the microstripline 3 is formed such that the electrical resistance per unit length becomes smaller as it separates from the end part that is connected to the tip end part 3a. In the embodiment illustrated in FIG. 2, the lead part 3b is formed such that the width widens in a direction (the y-direction in the drawing) that is orthogonal to the track width direction T, but it is not limited to this. FIG. 4 is a perspective view illustrating an example of another configuration of the microstripline. As illustrated in the drawing, the microstripline 3' can be formed so that the width widens in the track width direction T as it separates from the recording medium M.

The microstriplines 3 and 3' are disposed in a manner of contacting a main magnetic pole layer 21 as illustrated in FIGS. 2 and 4; however, this is not necessarily required, and merely needs to be disposed near the main magnetic pole layer 21.

The ferromagnetic thin film 4 can be configured so as to generate a desired assisting magnetic field by the ferromagnetic resonant generated by the current magnetic field in the periphery of the microstripline 3. In other words, the ferromagnetic thin film 4 can be arranged such that at least precession movement is caused by the above-described current magnetic field. Accordingly, the magnetization of the ferromagnetic thin film 4 faces in the orthogonal direction to the film surface in the above-described embodiment; however, it may also face in the in-plane direction (the x-direction in the drawing) that is parallel to the longitudinal direction of the tip end part 3a of the microstripline 3. Further, the ferromagnetic thin film 4, as in the above-described embodiment, may be disposed on the side surface (surface that is orthogonal to the recording medium M) of the tip end part 3a instead of the surface facing the recording medium M. In that case, the direction of the easy magnetization axis of the ferromagnetic thin film 4 needs to be in the direction that is orthogonal to the direction of the current magnetic field that the ferromagnetic thin film 4 senses.

Further, in the ferromagnetic thin film 4, the direction of the easy magnetization axis of a magnetic material can be either in the in-plane direction or in a direction orthogonal to the film surface. Therefore, remarkably many types of magnetic materials can be used as the ferromagnetic thin film 4. Fe, Co, Ni, FeNi, CoFe, CoFeB, CoPt, FePt, CoNiFe, NiFe, CoZrNb, FeN, FeSi, FeAlSi, FeCoTaZr, CoCrPtB, NiFeW, NiFeV, NiFeTa, CoFeW, CoFeV, CoFeTa, CoCrPt, NiWCr, CoCr, CoCrB, CoPtB, CoPtBO, FePt, FePeCu, FePeCuB, FePeC, FeCoAl, FeCoSi, FeCoGe, FeCoMn, FeCoCr, CoTaZr, CoTaZrNb, CoFeNb, CoFeZrNb, CoNiFeZrNb, CoFeTaZrNb, TbFeCo, FeCoNi, CoCrTa, CoCrTaPt, CoCrTaNb, CoMnSi, CoMnAl, CoFeGe, or the like can be used as a magnetic material.

Utilizing the ferromagnetic resonance of the ferromagnetic thin film for generating the assisting magnetic field is also advantageous in that frequency of the assisting magnetic field can be adjusted to match the ferromagnetic resonant frequency of the magnetic material used for the recording medium M.

It is known that the ferromagnetic resonant frequency (f) of a magnetic thin film is approximately given by the following Equation (1):

$$f \cong \gamma \sqrt{4\pi M_S (H_{ext} + H_k)} \qquad (1)$$

Here, $\gamma$ is the gyromagnetic ratio, $M_s$ is the saturation magnetization of the magnetic thin film, $H_{ext}$ is the external magnetic field, and $H_k$ is the anisotropy magnetic field of the magnetic thin film.

In other words, according to Equation (1), the ferromagnetic resonant frequency (f) can be adjusted to a desired frequency by changing the strength of the external magnetic field $H_{ext}$. Therefore, the assisting magnetic field at a desired frequency can be generated.

Figure 5A:
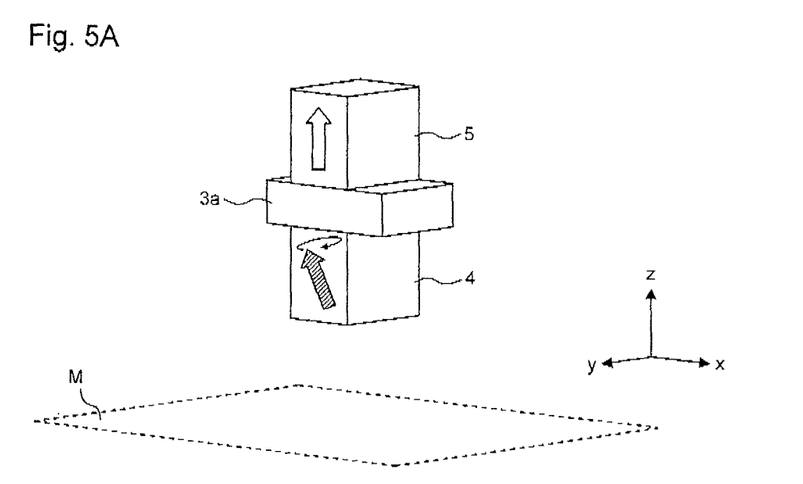
FIG. 5A and FIG. 5B are enlarged perspective views illustrating modified examples of the configuration of the vicinity of the tip end part of the microstripline.
Figure 5B:
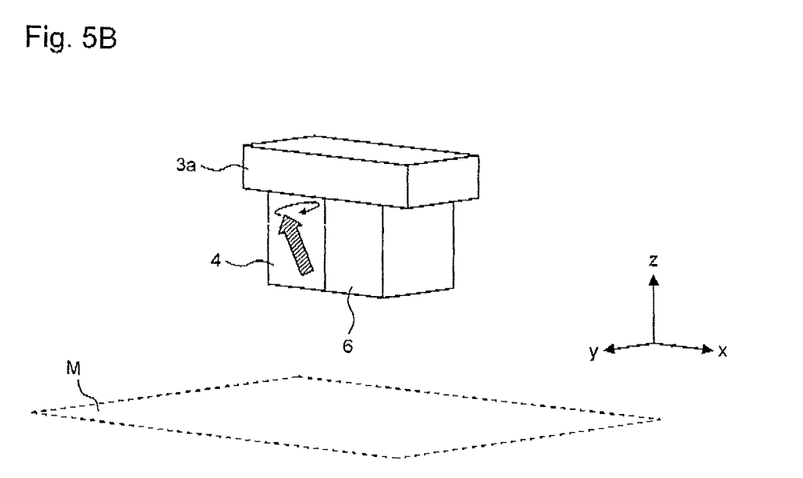

FIG. 5A and FIG. 5B illustrate a variation of the present embodiment that can change the strength of this type of external magnetic field.

When referring to FIG. 5A, a hard magnetic body 5 that applies a bias magnetic field to the ferromagnetic thin film 4 is arranged in a manner of facing the ferromagnetic thin film 4 with the tip end part 3a of the microstripline 3 sandwiched by the hard magnetic body 5 and the ferromagnetic thin film 4. By properly selecting the shape, size, material, and the like of the hard magnetic body 5, the strength of the bias magnetic field is changed so that the strength of the external magnetic field $H_{ext}$ that is applied to the ferromagnetic thin film 4 can be adjusted. Further, when referring to FIG. 5B, an antiferromagnetic body 6 is arranged adjacent to the ferromagnetic thin film 4. The antiferromagnetic body 6 is exchange-coupled with the ferromagnetic thin film 4 and functions to apply an exchange bias magnetic field to the ferromagnetic thin film 4. Likewise, by appropriately selecting the material for the antiferromagnetic body 6 and by changing the width (length of the x-direction) of the ferromagnetic thin film 4, the exchange bias magnetic field applied to the ferromagnetic thin film 4 is changed and similarly the strength of the external magnetic field $H_{ext}$ can be adjusted.

For example, FePt, CoPt, FePd, CrPt, or CoPd can be used as a material for hard magnetic body 5, and MnPt, NiMn, IrMn, PtPdMn, AuMn, RhMn, RuRhMn, OsMn, or CrPtMn can be used as a material for the antiferromagnetic body 6.

Furthermore, according to Equation (1), the ferromagnetic resonant frequency f also can be adjusted by changing the strength of the anisotropy magnetic field $H_k$ of the magnetic thin film. The strength of the anisotropy magnetic field $H_k$ can be changed by controlling the magnetic shape anisotropy and the crystalline magnetic anisotropy by the following method. That is, the magnetic shape anisotropy can be controlled by changing the material, the film formation conditions (annealing condition, sputtering condition, or the like), and the aspect ratio of the ferromagnetic thin film 4. Further, the crystalline magnetic anisotropy can be likewise controlled by changing the material and the film formation condition of the ferromagnetic thin film 4 and changing the material of a layer (the antiferromagnetic body 6) adjacent to the ferromagnetic thin film 4.

Next, a description is given of the evaluation results of the strength of the assisting magnetic field that is generated by the ferromagnetic thin film disposed on the tip end part of the microstripline and applied to the recording medium. The result illustrated here is related to the configuration (shape and dimension) described in relation to FIG. 3A and FIG. 3B.

Figure 6:
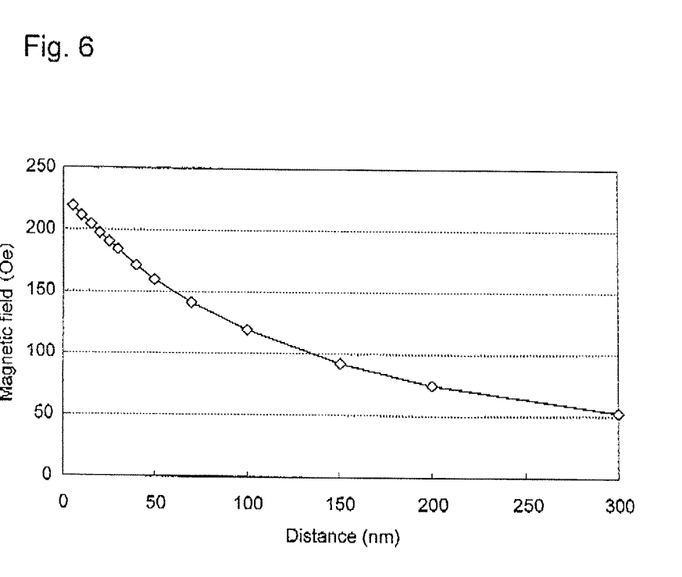
FIG. 6 is a diagram illustrating the strength of the current magnetic field in relation to the distance from the microstripline surface, which is calculated by the Maxwell's equation.

FIG. 6 is a graph illustrating the results of a current magnetic field that is generated in the periphery of the tip end part 3a of the microstripline 3 when current is applied to the microstripline 3 calculated using the Maxwell's equation. The horizontal axis is the distance from a surface of the microstripline 3, and the vertical axis is the strength of the current magnetic field. Au was used as the material of the microstripline 3, and the dimensions of the tip end part 3a of the microstripline 3 were the above-described dimensions (the length L1 of the track width direction was 2 μm, the width W1 was 200 nm, and the thickness T1 was 100 nm. See FIG. 3A). Further, the current applied to the microstripline 3 was current having a current density (current per unit area) of $5 \times 10^{15}$ A/m$^2$ at which Au is not fused.

As can be seen from FIG. 6, the strength of the current magnetic field decreases in inverse proportion according to the distance; however, when the thickness T2 of the ferromagnetic thin film 4 is 30 nm (see FIG. 3B), a sufficient current magnetic field of approximately $1.6 \times 10^4$ A/m (200 Oe) is applied to the ferromagnetic thin film 4.

Meanwhile, when the dimensions of the ferromagnetic thin film 4 were the above-described dimensions (the length L2 of the track width direction was 5 nm, the width W2 was 20 nm, and the thickness T2 was 30 nm, see FIG. 3A and FIG. 3B), the anisotropy magnetic field $H_k$ is $2.8 \times 10^4$ A/m (350 Oe) due to the shape anisotropy. As illustrated in FIG. 5B, when the antiferromagnetic body is arranged adjacent to the ferromagnetic thin film 4, and when the external magnetic field $H_{ext}$ of approximately $10.7 \times 10^4$ A/m (1350 Oe) is applied by the exchange bias thereof, the ferromagnetic resonant frequency (f) becomes approximately 17 GHz according to Equation (1). This value is sufficient as the assisting magnetic field of the microwave assisted magnetic recording system.

Figure 7:
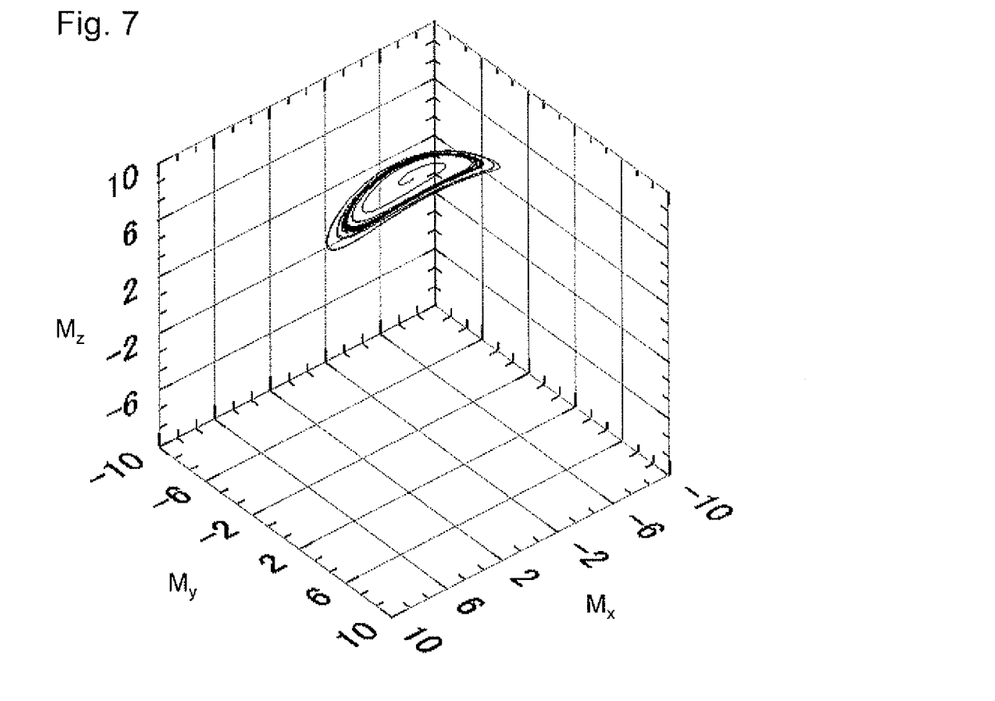
FIG. 7 is a drawing illustrating the precession movement of magnetization of a ferromagnetic thin film illustrated in FIG. 3A, which is calculated by the Landau-Lifshitz-Gilbert (LLG) simulation.

Under these conditions, the magnetization behavior of the ferromagnetic thin film 4 was calculated by Landau-Lifshitz-Gilbert (LLG) simulation. FIG. 7 is a graph illustrating the precession movement of magnetization of the ferromagnetic thin film 4 calculated by the LLG simulation. At that time, the current magnetic field applied to the ferromagnetic thin film 4 had the current density of $5 \times 10^{15}$ A/m$^2$ and the frequency of 20 GHz. The gyromagnetic ratio γ of the ferromagnetic thin film 4 as well as the Gilbert damping constant α were 28 GHz/T and 0.02, respectively.

From FIG. 7, it can be understood that the precession movement of the magnetization of the ferromagnetic thin film 4 is performed within the film surface (xy plane in the drawing) of the ferromagnetic thin film 4. Due to this precession movement, amplitude of approximately 48% of the saturation magnetization can be obtained in an in-plane direction of the recording medium M that is perpendicular to the track width direction T, that is, in the y-direction. The strength (effective value) of the AC magnetic field that is applied to the recording medium M due to the precession movement is $11.1 \times 10^4$ A/m (1400 Oe) according to calculation based on the Maxwell's equation when the distance between the ferromagnetic thin film 4 and the recording medium M is 5 nm. This is approximately 6 times higher than the strength (approximately $1.8 \times 10^4$ A/m (220 Oe), see FIG. 6) of the current magnetic field at a distance of 5 nm from the microstripline 3.

In this way, by disposing the ferromagnetic thin film 4 on the microstripline 3, the AC magnetic field (assisting magnetic field) applied to the recording medium M can be larger compared to when no ferromagnetic thin film 4 is disposed.

Figure 8:
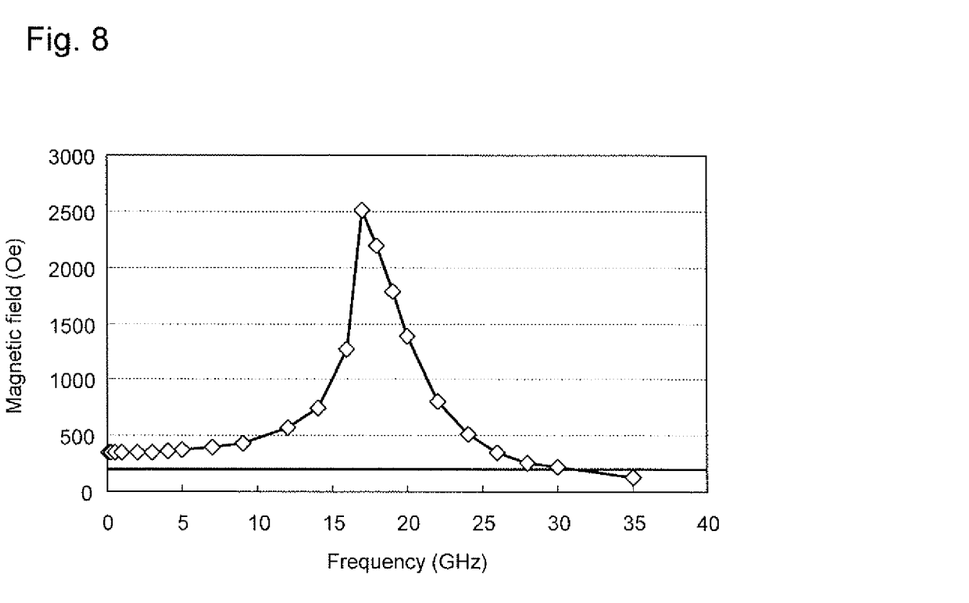
FIG. 8 is a diagram illustrating the strength of the AC magnetic field in relation to the frequency of the high frequency current applied to the microstripline, which is calculated by combining the LLG simulation with the Maxwell's equation.

Further, FIG. 8 shows the calculation result of the strength (effective value) of the AC magnetic field generated by the precession movement of the ferromagnetic thin film 4 when high frequency current is applied to the microstripline 3 while the frequency is changed. The calculation was performed by combining the LLG simulation and the Maxwell's equation. The horizontal axis is the frequency of the high frequency current applied to the microstripline 3, and the vertical axis is the strength of the AC magnetic field applied to the recording medium M when the distance between the microstripline 3 and the recording medium M is 5 nm. The solid line in the drawing illustrates the strength of the current magnetic field at the distance of 5 nm from the microstripline 3 as described above.

From FIG. 8, it can be understood that the strength of AC magnetic field generated by the ferromagnetic resonance of the ferromagnetic thin film 4 peaks when the ferromagnetic resonant frequency (f) of the ferromagnetic thin film 4 is in the neighborhood of 17 GHz. Therefore, the frequency of the high frequency current applied to the microstripline is preferably the frequency that corresponds to the ferromagnetic resonant frequency of the ferromagnetic thin film. As a result, an even larger AC magnetic field can be applied to the recording medium.

Furthermore, in order to make the AC magnetic field (assisting magnetic field) large, the material having a relatively small coercive force is preferable as a material of the ferromagnetic thin film 4 from among the above-described magnetic materials. This is because the magnetization amplitude can be made larger even with a small current magnetic field from the microstripline 3 by making the coercive force of the ferromagnetic thin film 4 smaller. Furthermore, a magnetic material having a large saturation magnetization is preferably used as a material of the ferromagnetic thin film 4 from the perspective of allowing a larger assisting magnetic field to be applied to the recording medium M even with the same magnetization amplitude.

Figure 9A:
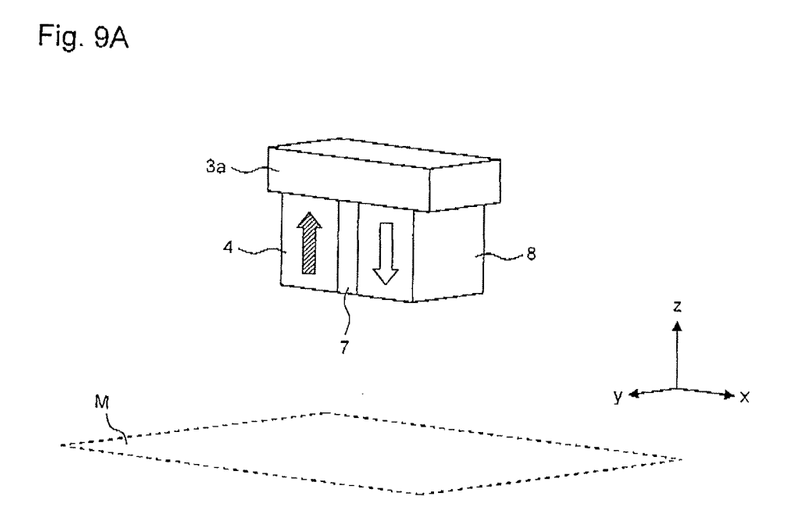
FIG. 9A and FIG. 9B are enlarged perspective views illustrating another modified example of the configuration of the vicinity of the tip end part of the microstripline.
Figure 9B:
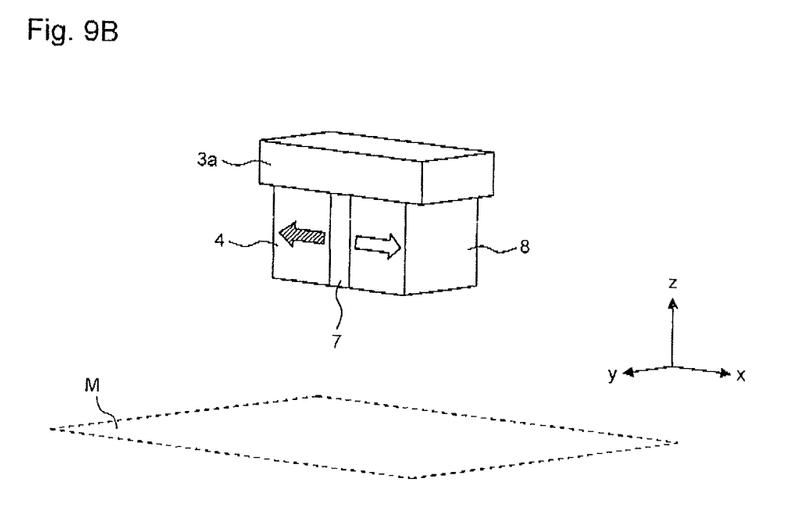

Next, a description is given regarding another method for adjusting the frequency of the assisting magnetic field. The method is to further dispose another ferromagnetic thin film that is synthetic antiferromagnetically coupled with the ferromagnetic thin film. FIG. 9A and FIG. 9B illustrate such modified examples of the present embodiment.

When referring to FIG. 9A and FIG. 9B, another ferromagnetic thin film 8 is disposed to face the ferromagnetic thin film 4 in a manner of sandwiching a nonmagnetic metal 7. These two ferromagnetic thin films 4 and 8 are synthetically and antiferromagnetically coupled with each other with the nonmagnetic metal 7 therebetween as described above. Therefore, with such configuration, the coupling intensity of two ferromagnetic thin films 4 and 8 can be changed by suitably selecting the nonmagnetic metal 7 and the material for the additional ferromagnetic thin film 8, and by modifying the width (length of the x-direction) of the nonmagnetic metal 7. Accordingly, the ferromagnetic resonant frequency of the field ferromagnetic thin films 4 and 8 can be adjusted by changing the effective magnetic field that acts on the ferromagnetic thin films 4 and 8. FIG. 9A illustrates a case where the directions of the easy magnetization axes of the two ferromagnetic thin films 4 and 8 are directions orthogonal to the film surface. FIG. 9B illustrates a case where the directions of the easy magnetization axes are in the film surface direction. In both configurations, as described above, the precession movement of the magnetization and therefore ferromagnetic resonance occur due to the current magnetic field by the microstripline 3.

Figure 10A:
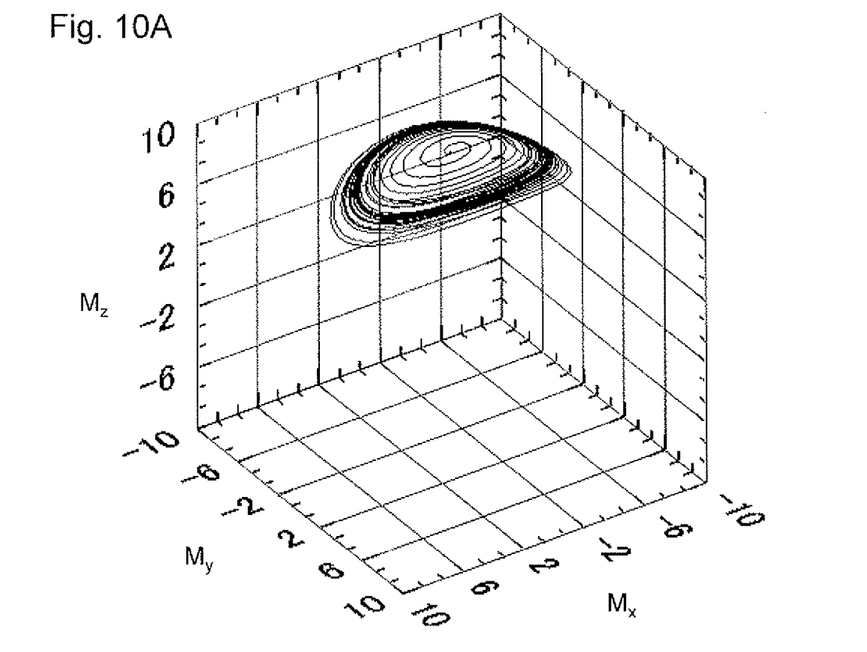
FIG. 10A and FIG. 10B are drawings illustrating the precession movement of magnetization of the two ferromagnetic thin films illustrated in FIG. 9A, which is calculated by the LLG simulation.
Figure 10B:
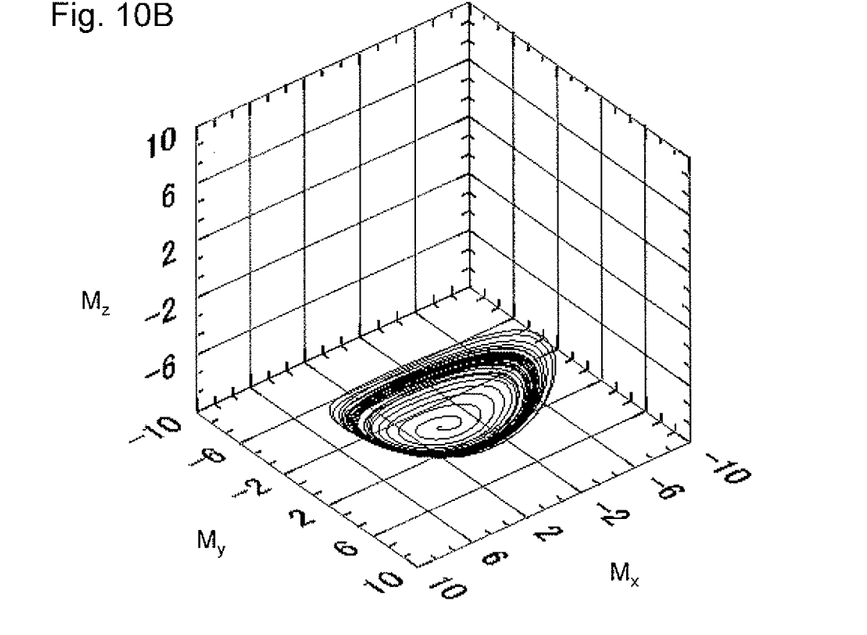

FIG. 10A and FIG. 10B illustrate the results of the magnetization behavior of each of those two ferromagnetic thin films 4 and 8 according to the configuration of FIG. 9A calculated using the LLG simulation in the same manner as the results illustrated in FIG. 7.

This calculation was conducted under the following conditions. That is, the exchange coupling coefficient J between the ferromagnetic thin films 4 and 8 was $15.9 \times 10^4$ A/m (2000 Oe), the saturation magnetization Ms for each of the ferromagnetic thin films 4 and 8 was 1 T, and the anisotropy magnetic field $H_k$ for each of the ferromagnetic thin films 4 and 8 was $8.0 \times 10^3$ A/m (100 Oe). Further, the Gilbert damping constant α was 0.02, the gyromagnetic ratio γ was 28 GHz/T, and the current magnetic field applied to the ferromagnetic thin films 4 and 8 from the microstripline 3 was $1.6 \times 10^4$ A/m (200 Oe).

From FIG. 10A and FIG. 10B, it can be understood that the magnetization of each of the ferromagnetic thin films 4 and 8 causes the precession movement within the film plane (the xy plane in the drawings). When synthesizing these magnetization movements, the oscillations become almost linear along a direction (the y direction in the drawings) orthogonal to the track width direction T. By utilizing magnetization that oscillates linearly in this manner as the assisting magnetic field, stable writing can be performed without dependence on the magnetization direction of the recording bit of the recording medium. Therefore, the assisting magnetic field is preferably a magnetic field that is linearly polarized as much as possible. Accordingly, the configurations illustrated in FIG. 9A and FIG. 9B are advantageous because, not only can the ferromagnetic resonant frequency be adjusted, but the magnetization trajectory of the ferromagnetic thin film can also approach being linear.

Figure 11:
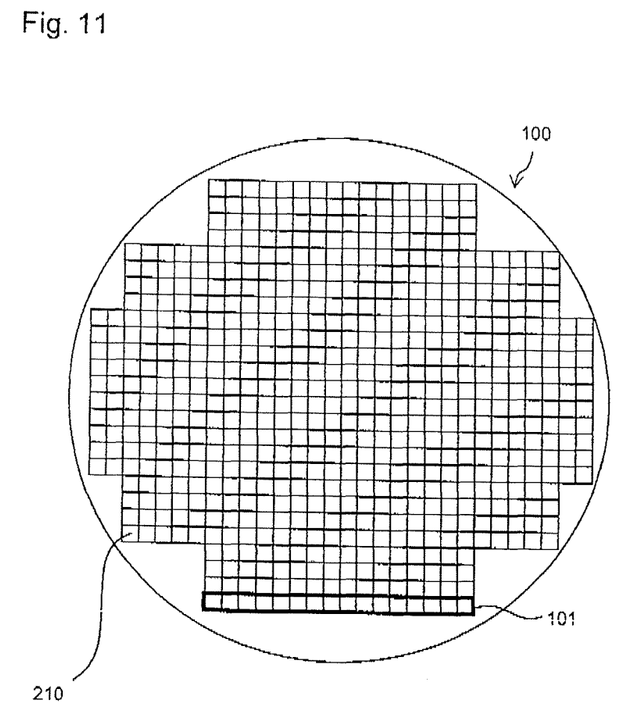
FIG. 11 is a plan view of a wafer that relates to the manufacture of the thin film magnetic head of the present invention.

Next, a description is given regarding a wafer that is used for manufacturing the above-described thin film magnetic head. Referring to FIG. 11, a stack that configures at least the above-described magnetic heads is formed on a wafer 100. The wafer 100 is divided into a plurality of bars 101 that are an operational unit for performing a polishing process onto the air bearing surface 2. Further, the bar 101 is cut after the polishing process and is separated into sliders 210 each including the magnetic head. In the wafer 100, a cut margin (not shown) for cutting the wafer 100 into the bar 101 and the bar 101 into the slider 210 is disposed.

Figure 12:
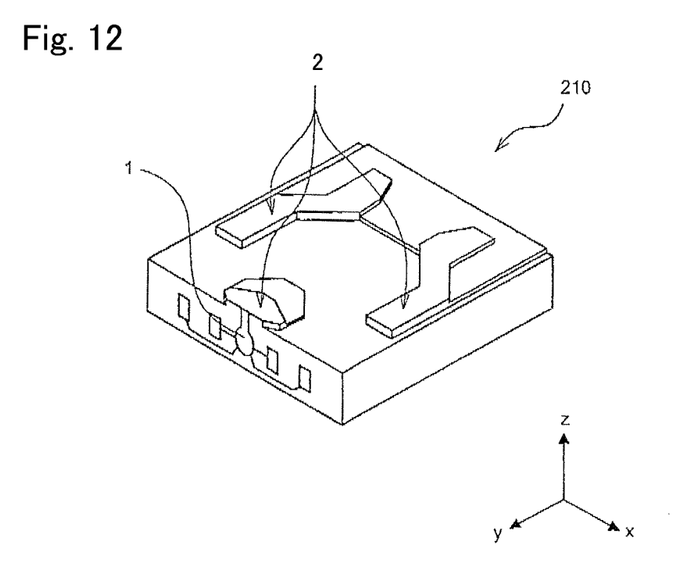
FIG. 12 is a perspective view of a slider of the present invention.

Referring to FIG. 12, a slider 210 has a substantially hexahedral shape, and one surface of the six outer surfaces is the air bearing surface 2 that faces a hard disk.

Figure 13:
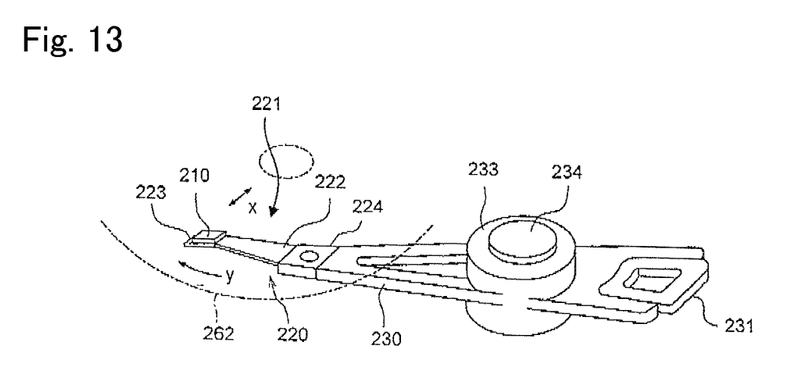
FIG. 13 is a perspective view of a head arm assembly that includes a head gimbal assembly in which the slider of the present invention is integrated.

Referring to FIG. 13, a head gimbal assembly 220 includes the slider 210 and a suspension 221 elastically supporting the slider 210. The suspension 221 includes a load beam 222, a flexure 223 and a base plate 224. The load beam 222 is formed of stainless steel in a plate spring shape. The flexure 223 is arranged in one edge part of the load beam 222. The base plate 224 is arranged in the other edge part of the load beam 222. The slider 210 is joined to the flexure 223 to give the slider 210 suitable flexibility. At a part of the flexure 223 to which the slider 210 is attached, a gimbal part is disposed to maintain the slider 210 in an appropriate orientation.

The slider 210 is arranged in the hard disk device so as to face the hard disk, which is a disk-shaped recording medium that is rotatably driven. When the hard disk rotates in the y-direction of FIG. 13, air flow passing between the hard disk and the slider 210 generates a downward lifting force in the z-direction to the slider 210. The slider 210 flies above the surface of the hard disk due to the lifting force. In the vicinity of an edge part of the slider 210 (edge part in bottom left of FIG. 12) on an air flow exit side, the magnetic head 1 is formed.

An assembly in which the head gimbal assembly 220 is mounted to an arm 230 is referred to as a head arm assembly 221. The arm 230 moves the slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 14:
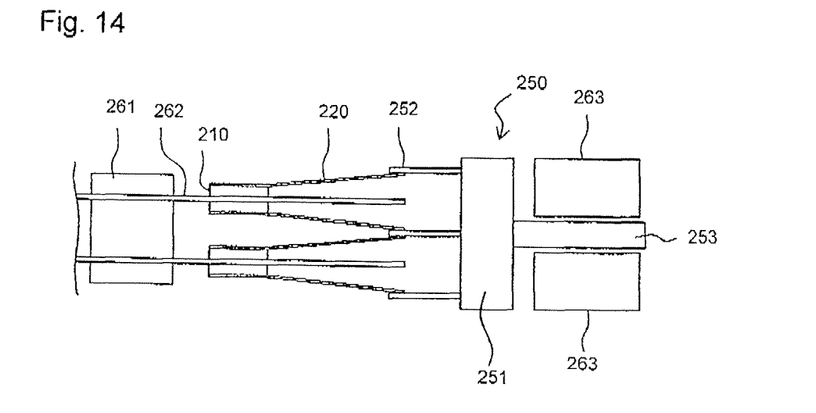
FIG. 14 is a side view of the head arm assembly in which the slider of the present invention is integrated.
Figure 15:
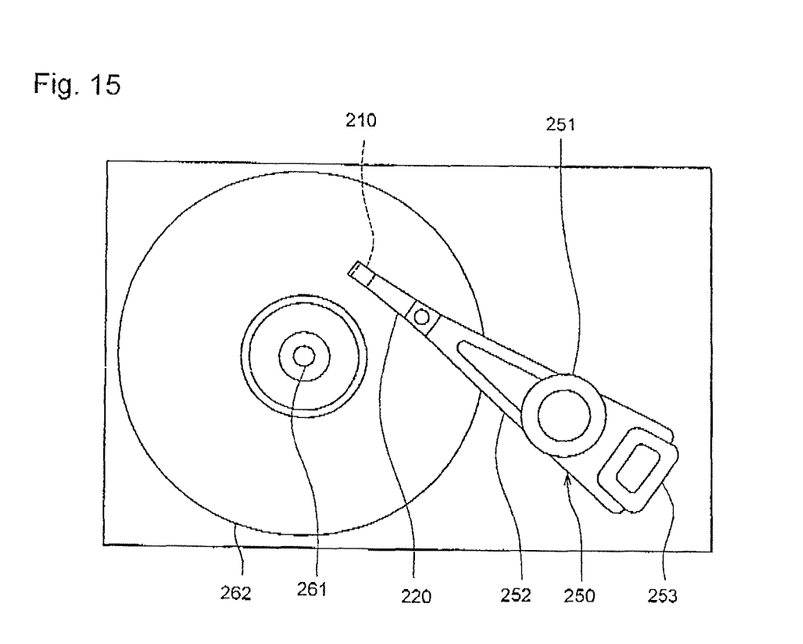
FIG. 15 is a plan view of the hard disk device in which the slider of the present invention is integrated.

Next, referring to FIGS. 14 and 15, a description is given with regard to a head stack assembly in which the above-described slider is integrated, and the hard disk device. The head stack assembly is an assembly in which the head gimbal assembly 220 is attached to each arm of a carriage including a plurality of the arms. FIG. 14 is a side view of the head stack assembly, and FIG. 15 is a plan view of the hard disk device. The head stack assembly 250 includes a carriage 251 including a plurality of arms 252. On each of the arms 252, the head gimbal assembly 220 is attached such that the head gimbal assemblies 220 align mutually at an interval in the vertical direction. On the side of the carriage 251, which is the backside to the arm 252, a coil 253 is mounted to be a part of the voice coil motor. The voice coil motor includes permanent magnets 263 arranged so as to sandwich the coil 253 and to face each other.

Referring to FIG. 14, the head stack assembly 250 is integrated in the hard disk device. The hard disk device includes multiple hard disks 262 attached to a spindle motor 261. For each of the hard disks 262, two sliders 210 are arranged in a manner of sandwiching the hard disk 262 and facing each other. The head stack assembly 250 except for the slider 210 and the actuator, which correspond to a positioning device according to the present invention, position the slider 210 with respect to the hard disk 262 as well as supports the slider 210. The slider 210 is moved in the track crossing direction of the hard disk 262 by the actuator, and is positioned with respect to the hard disk 262. The thin film magnetic head 1 included in the slider 210 records information to the hard disk 262 with the recording head, and reproduces information recorded on the hard disk 262 with the reproducing head.

While preferred embodiments of the present invention have been shown and described in detail, and it is to be understood that variety of changes and modifications may be made without departing from the spirit of scope of the attached claims or its scope.

What is claimed is:

1. A magnetic head that writes information to a recording medium, comprising:
    a magnetic pole layer that generates a writing magnetic field to the recording medium;
    a microstripline that is disposed in proximity to the magnetic pole layer and to which high frequency current is applied; and
    a ferromagnetic thin film that is disposed on a portion of the microstripline that faces the recording medium, and that generates a high frequency alternate-current (AC) magnetic field to be applied to the recording medium, using a current magnetic field generated on the microstripline due to the high frequency current.

2. The magnetic head according to claim 1, wherein
    the ferromagnetic thin film is arranged on the microstripline such that a direction of an easy magnetization axis of the ferromagnetic thin film and a direction of the current magnetic field on a surface of the microstripline, on which the ferromagnetic thin film is disposed, are orthogonal to each other.

3. The magnetic head according to claim 2, wherein
    the high frequency current that has a frequency that corresponds to a ferromagnetic resonant frequency of the ferromagnetic thin film is applied to the microstripline.

4. The magnetic head according to claim 1, wherein
    the microstripline has a tip end part that is positioned to face the recording medium and that extends in parallel to a track width direction of the recording medium, and
    the ferromagnetic thin film is arranged on the tip end part such that a film surface of the ferromagnetic thin film faces a surface of the recording medium.

5. The magnetic head according to claim 4, wherein
    a direction of an easy magnetization axis of the ferromagnetic thin film is in a direction orthogonal to the film surface.

6. The magnetic head according to claim 4, wherein
    a direction of an easy magnetization axis of the ferromagnetic thin film is in an in-plane direction parallel to a direction in which the tip end part extends.

7. The magnetic head according to claim 4, wherein
    the microstripline has a lead part connected to the tip end part, and the lead part is formed such that an electrical resistance per unit length becomes smaller as the lead part separates from an end part where the tip end part is connected.

8. The magnetic head according to claim 1, further comprising:
    a hard magnetic body that applies a bias magnetic field to the ferromagnetic thin film.

9. The magnetic head according to claim 1, further comprising:
    an antiferromagnetic body that exchange couples with the ferromagnetic thin film and that applies an exchange bias magnetic field to the ferromagnetic thin film.

10. The magnetic head according claim 1, further comprising:
    another ferromagnetic thin film that is disposed to face the ferromagnetic thin film with a nonmagnetic metal positioned therebetween and that is synthetic antiferromagnetically coupled with the ferromagnetic thin film through the nonmagnetic metal.

11. A slider, comprising:
    the magnetic head according to claim 1.

12. A wafer in which a multilayer body that configures the magnetic head according to claim 1 is formed.

13. A head gimbal assembly, comprising:
    the slider according to claim 11; and
    a suspension that elastically supports the slider.

14. A hard disk device, comprising:
    the slider according to claim 11; and
    a device that supports and positions the slider in relation to the recording medium.

* * * * *